US006691240B1

(12) United States Patent
Stotzer et al.

(10) Patent No.: US 6,691,240 B1
(45) Date of Patent: Feb. 10, 2004

(54) SYSTEM AND METHOD OF IMPLEMENTING VARIABE LENGTH DELAY INSTRUCTIONS, WHICH PREVENTS OVERLAPPING LIFETIME INFORMATION OR VALUES IN EFFICIENT WAY (75) Inventors: Eric J. Stotzer, Houston, TX (US); David Hoyle, Glendale, AZ (US); Joseph Zbiciak, North Richland Hills, TX (US)

(73) Assignee: Texas Instruments Incorporated, Dallas, TX (US)

( * ) Notice: Subject to any disclaimer, the term of this patent is extended or adjusted under 35 U.S.C. 154(b) by 697 days.

(21) Appl. No.: 09/702,518

(22) Filed: Oct. 31, 2000

Related U.S. Application Data (60) Provisional application No. 60/183,527, filed on Feb. 18, 2000, provisional application No. 60/183,359, filed on Feb. 18, 2000, and provisional application No. 60/173,797, filed on Dec. 30, 1999.

(51) Int. Cl.[7] ................................................ H04L 5/00
(52) U.S. Cl. ........................ 713/400; 713/400; 712/123; 712/224; 714/100
(58) Field of Search .......................... 713/400; 712/123, 712/204; 714/100

(56) References Cited

U.S. PATENT DOCUMENTS

| 4,893,233 | A | * | 1/1990 | Denman Marvin A. et al. ...................... 712/244 |
| 4,903,264 | A | * | 2/1990 | Talgam et al. ................. 714/25 |
| 5,406,518 | A | * | 4/1995 | Sun et al. .................... 365/194 |
| 5,802,360 | A | * | 9/1998 | Fernando ..................... 712/229 |
| 5,809,272 | A | * | 9/1998 | Thusoo et al. ............... 712/210 |
| 5,941,980 | A | * | 8/1999 | Shang et al. ................. 712/204 |
| 6,092,176 | A | * | 7/2000 | Iadonato et al. .............. 712/23 |
| 6,175,908 | B1 | * | 1/2001 | Pickett ....................... 712/204 |
| 6,516,408 | B1 | * | 2/2003 | Abiko et al. ................. 712/227 |

* cited by examiner

Primary Examiner—Thomas M. Heckler
Assistant Examiner—Nitin C Patel
(74) Attorney, Agent, or Firm—Robert D. Marshall, Jr.; W. James Brady, III; Frederick J. Telecky, Jr.

(57) ABSTRACT

A method for implementing a variable length delay instruction includes the steps of designating a source register for holding information and designating a destination register for retrieving the information. A first number of cycles before retrieval of the information to the destination register then is determined, and the information is transferred from the source register to delaying device, such as queuing device, for the first number of cycles. Finally, the information is written from the delaying device to the destination register. An apparatus for implementing variable length delay instructions includes an input line for reading information from a source register; delaying device for receiving said information read from the source register; a multiplexer; and a select line. A trigger signal is transmitted to the multiplexer, thereby instructing the multiplexer to write the information to a destination register.

15 Claims, 4 Drawing Sheets

| CYCLE | PIPELINE | | | | | STATE |
|---|---|---|---|---|---|---|
| 0 | A:1 | | | | | PROLOG |
| II | B:1 | A:2 | | | | |
| II*2 | C:1 | B:2 | A:3 | | | |
| II*3 | D:1 | C:2 | B:3 | A:4 | | |
| II*4 | E:1 | D:2 | C:3 | B:4 | A:5 | STEADY |
| II*(N-5) | E:1 | D:2 | C:3 | B:4 | A:5 | STEADY |
| II*(N-4) | | E:2 | D:3 | C:4 | B:5 | EPILOG |
| II*(N-3) | | | E:3 | D:4 | C:5 | |
| II*(N-2) | | | | E:4 | D:5 | |
| II*(N-1) | | | | | E:5 | |

*FIG. 1*

| CYCLE | ITERATION (N-1) | ITERATION (N) |
|---|---|---|
| 0 | $S_1$ (def v1) | |
| 1 | $S_2$ | $S_1$ (def v2) |
| 2 | $S_3$ (use v1) | $S_2$ |
| 3 | | $S_3$ (use v2) |

*FIG. 2*

| CYCLE | INSTRUCTION | | COMPONENTS | Y VALUES |
|---|---|---|---|---|
| 0 | A | | P | Def $y=x_1$ |
| 1 | B | | P | |
| 2 | C | A | K | Def $y=x_2$ |
| 3 | D | B | K | Use $y=x_1$ |
| 4 | | C | E | |
| 5 | | D | E | Use $y=x_2$ |

*FIG. 5a*

| CYCLE | INSTRUCTION | | COMPONENTS | Y VALUES |
|---|---|---|---|---|
| 0 | A | | P | |
| 1 | B | | P | |
| 2 | C | A | K | Def $y=x_1$ |
| 3 | D | B | K | Use $y=x_1$ |
| 4 | | C | E | Def $y=x_2$ |
| 5 | | D | E | Use $y=x_2$ |

OPCODE

| NAME  | OFFSET 31 30 29 | 28 | 27 26 25 24 23 | 22 21 20 19 18 | 17 16 15 14 13 | 12 | 11 10 9 8 7 6 5 4 3 2 | 1 0 |
|---|---|---|---|---|---|---|---|---|
| NAME | creg | z | dst | src | Opfield | x | 0 0 0 1 1 1 1 0 0 | s p |
| WIDTH | 3 | 1 | 5 | 5 | 5 | 1 | 10 | 1 1 |

FIG. 6a

| PIPELINE STAGE | E1 | E2 | E3 | E4 |
|---|---|---|---|---|
| READ | src2 | | | |
| WRITTEN | | | | dst |
| UNIT IN USE | .M | | | |

SYSTEM AND METHOD OF IMPLEMENTING VARIABE LENGTH DELAY INSTRUCTIONS, WHICH PREVENTS OVERLAPPING LIFETIME INFORMATION OR VALUES IN EFFICIENT WAY

This application claims priority under 35 USC §119(e)(1) of Provisional Application No. 60/173,797, filed Dec. 30, 1999;Provisional Application No. 60/183,359, filed Feb. 18, 2000; and Provisional Application No. 60/183,527, filed Feb. 18, 2000.

BACKGROUND

1. Field of the Invention

The invention relates to methods and apparatus for improving the scheduling of instructions in a pipelined loop. In particular, the invention relates to methods and apparatus for implementing variable length delay instructions.

2. Description of Related Art

Generally, a software pipelined loop implements multiple loop iterations, which execute in parallel. This is accomplished by exploiting the fine-grained, instruction level parallelism (IPL) that is available across the branches of a loop. The goal of software pipelining is to maximize the number of loop iterations executing in parallel and, thereby, increase loop throughput. Software pipelining is an instruction scheduling technique. Pipelining is a method for executing instructions in an assembly-line fashion. It is a design technique for reducing the effective propagation delay per series of stages, each of which performs a portion of the operation. A series of data is typically clocked through the pipeline in sequential fashion, advancing one stage per clock period. A scheduling algorithm for use in software pipelining constructs a legal instruction schedule.

The rate at which new loop iterations are started is called the iteration interval (II). The minimum iteration interval (MII) is the lower bound on the iteration interval for which a valid schedule may be established. Modulo scheduling is a known technique for establishing software pipelined-loops. In modulo scheduling, the schedule for a single iteration is divided into a sequence of stages, each having the length of the iteration interval. In the steady state execution of the software pipelined-loop, each of the stages executes parallel.

The instruction schedule for a software-pipelined loop has at least three (3) components: a kernel, a prolog, and an epilog. The kernel is the instruction schedule that executes in the steady state. In the kernel, an instruction scheduled at the kth cycle executes in parallel with all the instructions scheduled at the kth cycle modulo iteration interval. This is known as the modulo constraint, and this constraint defines the basic feature of "modulo scheduling." The prolog and epilog are the instruction schedules that setup, i.e., "prime" the software pipelines, and conclude the execution of the loop kernel, i.e., "drain" the software pipelines, respectively.

Figure 1:
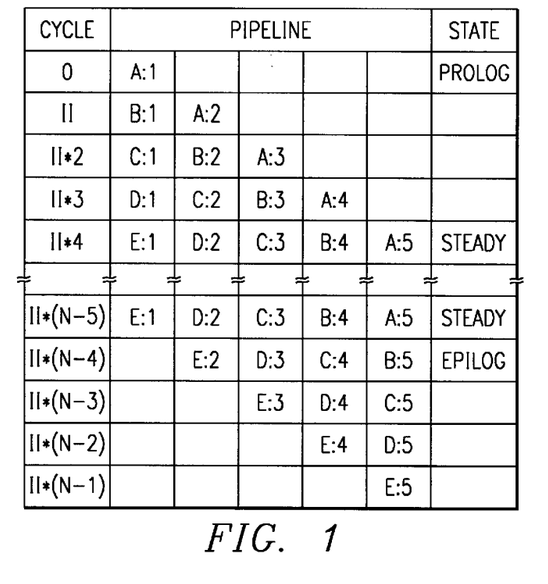
FIG. 1 depicts an example of modulo scheduling.

Referring to FIG. 1, an example of modulo scheduling is depicted. A, B, C, D, and E are the stages of a loop iteration. In the steady state, all five (5) stages execute in parallel. However, each executes from a different iteration, i.e., at a different stage with respect to the previous iteration. A stage in the software pipeline is completed after the cycles required for each iteration interval (II) are completed. A single iteration produces a predetermined result in the time required to complete five (5) stages. In the steady state of the software-pipelined loop, however, a result is available upon completion of each stage, i.e., after the cycles required to complete each iteration interval. This is one motivation for performing software pipelining. The minimum iteration interval required for a software pipelined-loop is determined by resource and dependency constraints.

Figure 2:
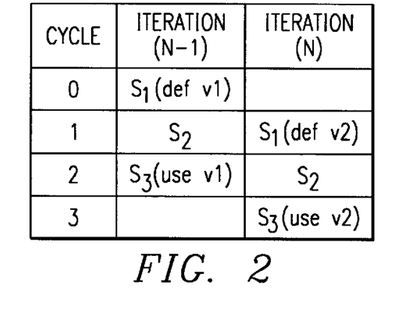
FIG. 2 shows two (2) iterations from the execution trace of a software pipelined loop, showing the overlapping lifetimes of values v1 and v2.

The lifetime of any value in any such loop is the number of cycles between the placement in the schedule for the operation that defines a particular value (the "def") and the last operation that uses that value (the "last use"). The value must be "alive," i.e., available for recovery, until its last use. A schedule is invalidated if a value has a lifetime that is greater than iteration interval. If a value "lives" too long, i.e., its lifetime is greater than the iteration interval, an operation in a successive iteration executing in parallel with the current iteration may overwrite the value before its last use in the current iteration. Referring to FIG. 2, two (2) iterations are shown from the execution trace of a software-pipelined loop. Each $S_i$ is an operation that computes a result in one cycle. Assuming an architecture similar to the c6x architecture, available from Texas Instruments, Inc., of Dallas, Tex., a variable may be written and read on the same cycle, such that the read step logically occurs before the write step. The operations depicted in FIG. 2 are annotated to indicate whether they define or use the variable v.

A register is a small area of a high-speed memory, located within a processor or electronic device that is used for temporarily storing information or instructions. Each register is given a name, contains a few bytes of information and is referenced by programs. Values (v1, v2, v3, . . . ) generated in each loop iteration exist sequentially in a single register.

Referring again to FIG. 2, however, the lifetimes of values v1 and v2 are depicted as overlapping. This overlapping causes v2 to overwrite (or kill) v1 before the last values are used. Such excessive lifetimes may occur as an artifact of the scheduling algorithm or due to data dependencies that split and then join in the data precedence graph for the loop block. The values for v1 and v2 (actually v1, v2, v3, . . . , vN; where N equals the number of loop iterations, i.e., the loop trip count) are sharing the same register. However, only one value v# may exist on the register at a time.

This problem is experienced in VLIW architectures. Moreover, this problem is experienced in architectures that implement and support instruction level parallelism and use instruction scheduling techniques, such as software pipelining, to exploit parallelism.

One technique for solving the problem of excessive lifetimes is to insert move instructions into the loop in order to write the value to another register before the value is overlapped by a successive iteration. Nevertheless, the lifetime of a register value may be so long that it may take multiple move instructions to split the register value into multiple live ranges and thereby avoid overlapping. Moreover, insertion of these additional move instructions may reduce the performance of the loop and may further complicate the scheduling and register allocation processes. Another technique is modulo variable expansion. In this technique, the kernel is unrolled, and values with overlapping lifetimes are renamed.

Pipelined loops may be especially important for the efficient and effective programming of digital signal processors (DSPs), such as those used extensively in the telecommunications industry. In DSPs, operating time and information storage are critical constraints on programming. In particular, information storage in registers and memory is extremely limited, and allocation of these resources limits the number of operations, which may be performed simultaneously. Further, the need to store information to and to retrieve information memory imposes significant time constraints on DSP operation. The time which a DSP spends "waiting" for the retrieval of information from memory limits the speed with which the DSP may complete operations and, therefore, may limit the total number of operations which the DSP may execute within a given period of time.

SUMMARY OF THE INVENTION

Thus, a need has arisen for a method for eliminating, reducing, or compensating for the problem of excessive and overlapping value lifetimes by writing information (values) to another register before the information (values) is (are) overwritten by a successive iteration. Further, a need has arisen for a method of writing information one register to another register with a variable delay operand. Further, a need has arisen for a method and apparatus for delaying the use of information without storing it to memory and retrieving it or holding it for a prolonged period within a single register.

An illustrative embodiment of the present invention seeks to provide a microprocessor, and method for operating a microprocessor, that improves digital signal processing performance. Aspects of the invention are specified in the claims. In an embodiment of the present invention, a digital signal processor is provided which has improvements over prior art devices including additional instructions that reduce code size and increase register flexibility.

In an embodiment, the invention is a method for implementing a variable length delay instruction. The method comprises the steps of defining an operation, which may include any type of machine instruction (e.g., MV, ADD, MPY, and the like); determining a delay between the defined operation and a future using operation; and implementing a queuing or delaying means, which may be part of the defined operation or a separate operation (or apparatus). Depending on the nature of the defined operation, the method may further include the steps of defining source operands, memories, or registers and defining a destination operand, memory, or register.

In another embodiment, the invention is a method for implementing a variable length delay instruction with respect to a move instruction. The method includes the steps of designating a source register for holding information and designating a destination register for retrieving the information. A first number of cycles before retrieval of the information to the destination register then is determined, and the information is transferred from the source register to delaying device, such as queuing device, for the first number of cycles. Finally, the information is written from the delaying device to the destination register.

For example, a new move instruction writes information from one register to another register with a variable delay operand. Generally, operands are the parts of an instruction that designates where a central processing unit (CPU) will fetch or store information. Specifically, the move instruction may be of the form: MVsrc_reg, dst_reg, delay. By this instruction, information or a value from the source register, src_reg, is written to the destination register, dst_reg, but the arrival of the information or value from the source register at the destination register is delayed by a predetermined number of cycles, delay.

In a further embodiment, the invention is an apparatus for implementing variable length delay instructions. The apparatus includes an input line for reading information from a defining operation or a source register; delaying device for receiving the information read from the defining operation or the source register; a multiplexer; and a select line. A trigger signal is transmitted to the multiplexer via the select line, thereby instructing the multiplexer to write the information to a using operation or a destination register.

In yet another embodiment, the invention is an apparatus for implementing variable length delay instructions. The apparatus includes an input line for reading information from a defining operation or a source register; a queue of serially-connected, holding devices for receiving the information read from the defining operation the source register; a multiplexer aligned in parallel with the serially-connected, holding devices; and a select line. A trigger signal is transmitted to the multiplexer via the select line, thereby instructing the multiplexer to write the information to a using operation or a destination register.

In still another embodiment, the invention is an apparatus for implementing variable length delay instructions. The apparatus includes an input line for reading information from a defining operation or a source register; a plurality of two-way multiplexers, each of the multiplexers placed between a pair of holding devices; and a select line. A trigger signal is transmitted to each of the plurality of multiplexers, thereby instructing at least one of the multiplexers to write the information to a using operation or a destination register.

It is an advantage of this technique that the loop scheduler may generate improved or optimal software pipelines. It is a feature of this technique that while it may not prevent excessive lifetime values, it reduces or minimizes the number of move instructions required to prevent overlapping lifetimes. It is a further feature of this technique that the delay mechanism may be used to minimize the register information (value) lifetimes.

It is a further advantage of this invention that it avoids the complexities of implementing the hardware of a rotating register file to modify the register file or modulo variable expansion for unrolling the loop kernel and renaming the register values that overlap.

Other objects, features, and advantages will be apparent to persons skilled in the art by the following detailed description and the accompanying drawings.

BRIEF DESCRIPTION OF THE DRAWINGS

The present invention may be more readily understood with reference to the following drawings in which.

DETAILED DESCRIPTION OF PREFERRED EMBODIMENTS

The invention involves methods and apparatus for delaying the arrival of information or a value obtained from a defining operation or a source register at a using operation or destination register. A pipeline may consists of a defining and a using operation. Each operation has a latency which may be defined as the time it takes to complete the function of the operation. Further, dependencies exist between operations, such that an operation may define values that are source operands for other operations. In a pipeline, an operation, i.e., a machine instruction, may use operands and may define operands. For example, a defining operation may be written as:

| ADD a,b,c | % c = a + b |
|---|---| and a using operation may be written as:

| MPY c,q,p | % p = c * q, |
|---|---| where the value of "c" calculated in the defining operation is later used in the using operation. To perform instruction scheduling, the dependency between a plurality of operations is considered and the latency is a compared to determine how long information or values are carried in a register between a defining operation and a future using operation.

The goal of instruction scheduling is to minimize the time during which a register is tied up with information or values waiting for a using operation. Software pipelining is a type of instruction scheduling which seeks to minimize the lifetimes, and consequently, the register requirements, of the information or values by scheduling the defining and using operations as close together as possible. Because of resource constraints and other dependencies, such proximate scheduling may not always be possible. Moreover, the longer the latency of an operation, the longer the period of time that the information or values are held in a register. Therefore, the present invention solves this problem by delaying the writing of the information or values from the defining operation (or source register) to the using operation (or destination register) until the information or value is needed.

As a result, register lifetimes are reduced by the invention, and registers are more efficiently utilized. This allows instruction scheduling to better allocate registers and permits more loops to be software pipelined with the same resources.

With respect to a move operation, each pipeline may define a source register and a destination register and a definition and a utilization instruction. For example, the definition instruction may cause the particular information or a particular value to be read into the source register. After some predetermined number of cycles, n, the information or value is retrieved to the destination register. The utilization instruction then takes the information value from the destination register and performs some function after n cycles. The methods and apparatus of the present invention may place a variable length delay operand in the form of a move instruction on the definition instruction. In an embodiment, the move instruction may be encoded by a number representing the number of cycles by which the move from the source register to the destination register is to be delayed.

As a result of the delay, the value information identified in the source register is not retrieved to the destination register until the passage of n cycles, e.g., where n is some positive integer value. This delay allows the destination register to be used for other purposes for n−1 cycles. Further, the source register also may be used for other purposes after n−1 cycles. After the delay is completed, it may be no longer necessary to maintain the information or value in the source register. The source register is a container, which may hold the information or value during the delay, but at the end of the delay, the destination register retrieves, i.e., stores or retains, information or a value from in the source register.

Figure 3:
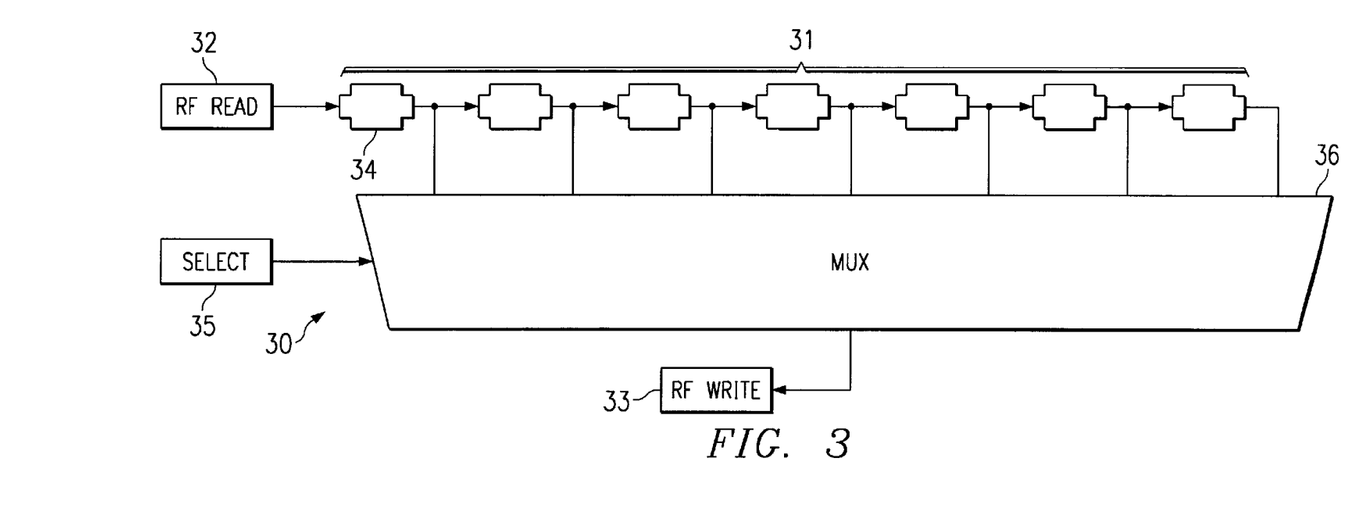
FIG. 3 is a diagram of a first embodiment of a circuit for implementing the present invention.

The source and destination registers may be actual machine registers, such as those used in a c6000 series DSP architecture, available from Texas Instruments, Inc., of Dallas, Tex. The c6000 series DSP architecture combines c62x fixed-point DSPs with performance levels ranging from 1200 million instructions per second (MIPS) up to 2400 MIPS, or c67x floating-point devices starting at 600 million floating-point operations per second (MFLOPS) and include the first floating-point DSP to achieve 1 billion floating-point operations per second (GFLOPS) and provides a fixed and floating point code compatible roadmap to 5000 MIPs for the c62x generation fixed-point devices and to more than 3 GFLOPS for floating-point devices Referring to FIG. 3, a diagram of a first embodiment of a circuit 30 for implementing the present invention is depicted. In this first embodiment, a queue 31 is established in which a port 32 to a source register file is placed at the head of the queue. The delay in the move of the source register value to the destination register is achieved by varying the point of extraction of the information or value from queue 31. Thus, for each loop cycle of the delay, the information or value is shifted or stepped through the queue 31 until the delay is completed (expires) and the information or value is then written to the destination register 33. Data holding devices 34 in queue 31 may be latches or the like. However, in the circuit of FIG. 3, a counter, such as a "time bomb" counter or similar instruction, may be incorporated into the pipeline along with the queued information or value to trigger the information value to assert a select line 35 on a multiplexer 36 and thereby initiate writing to destination register 33.

Figure 4:
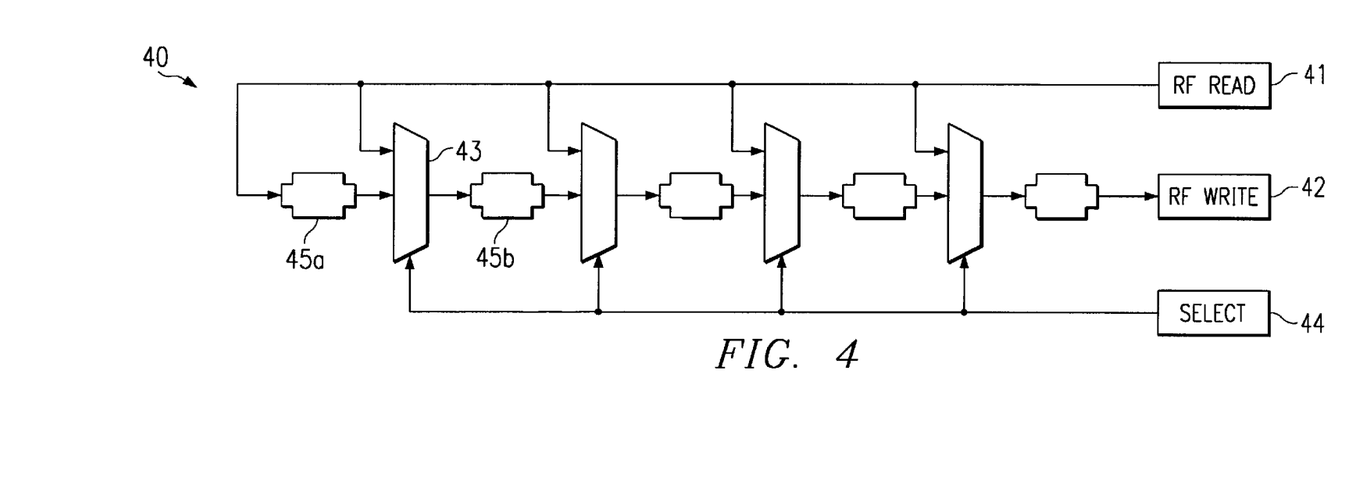
FIG. 4 is a diagram of a second embodiment of a circuit for implementing the present invention.

FIG. 4 is a diagram of a second embodiment of a circuit 40 for implementing the present invention. If the information or value from the source register 41 is not immediately written to the destination register 42, it must be placed somewhere during the duration of the delay. For example, the retrieval of the information or value to destination register 42 may be delayed almost indefinitely, if the information is repeatedly recycled, before eventually being directed by a trigger signal through a select line 44 to destination register 42. The delay in the move of the source register value to the destination register is achieved by varying the point of insertion of the information or value into apparatus 40. In this second embodiment, a two-way multiplexer 43 may be placed between each pair of holding devices 45a and 45b, e.g., latches, to select between information or values from a previous stage in the queue and information or values read to be written to a destination register 42.

In still another embodiment, a small static random-access memory (SRAM) may implement a first-in, first-out (FIFO) inventory procedure. This FIFO procedure may include circular head and tail pointers reduce or to avoid unnecessary of the movement of information or values. Although this embodiment may provide advantages with respect to the power requirements and the required circuit board area, this embodiment may be too slow for operational purposes in DSP applications.

Figure 5A:
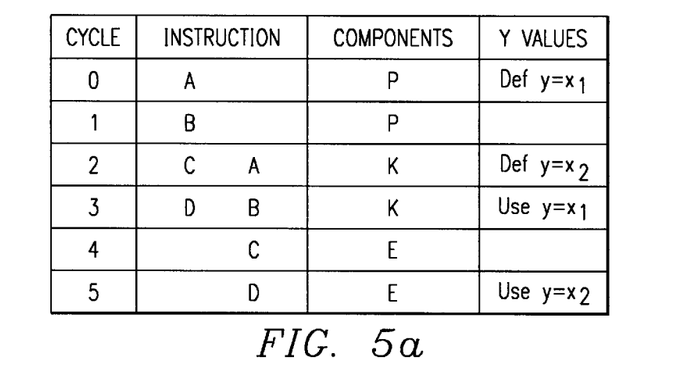
FIGS. 5a and 5b are depictions used to explain methods of this invention to accommodate excessive value lifetimes.

The invention will be further clarified by consideration of the following example, which is intended to be purely exemplary of the use of the invention. Referring to FIG. 5a, the following instructions may be defined by A, B, C, and D:

A: MV X,Y
B: SHR X,1,X
C: NOP
D: STW Y, "mem", and the instruction schedule consists of three components: the prolog (P), the epilog (E), and the kernel (K).

A value of x is read to y at time zero. That value then is held for three (3) cycles in y before it is read at instruction D. In FIG. 5a, the problem with overlapping instructions and valve lifetimes are demonstrated.

At cycle zero (0), the value of x is read by y. However, at cycle three (3), a new value of x is read to y and replaces (or kills) the previous value of y. The previous value of x is replaced with the new value of x. When the first store instruction executes at cycle four (4), instead of storing $y=x_1$, to the memory location pointed to by "mem," $y=x_2$ is stored. Thus, because of excessive lifetimes, the incorrect value for y is stored to memory.

Figure 5B:
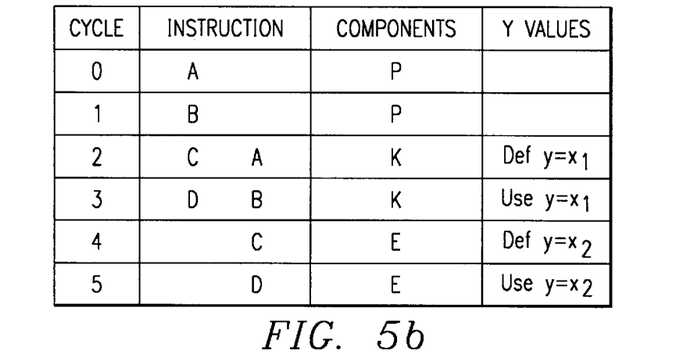

As can be seen from this example, a basic problem solved by this invention is to ensure that the appropriate information or value is delivered to the appropriate register upon completion of the selected group of instructions. Referring to FIG. 5b, the same four (4) instructions again may be considered. However, in accordance with the foregoing description, instruction A may be modified to include a delay n, such that the reading of the value y is delayed until a predetermined number of cycles have elapsed. For example, instructions A, B, C, and D may be written as follows:

A: MV X, Y,2
B: SHR X,1,X
C: NOP
D: STW Y, "mem".

As shown in FIG. 5b, this set of instructions delays the writing of the value y for two (2) cycles, so that the $y=x_1$ value is not overwritten by $y=x_2$ value before instruction D stores $y=x_1$. The addition of this delay to the instruction A eliminates the ordering problems caused by the overlapping lifetimes.

A significant problem with scheduling is the alignment of the instructions, such that the appropriate values are retrieved to the appropriate registers for predetermined uses at the appropriate time. Like memory capacity, registers are critical in programming, especially when the software instructions are implemented within the programming constraints of a DSP. Register space become precious and, generally, information (or values) which is (are) not in use may not be allowed to languish in a register. The present invention permits information to be moved to and from registers in a timely and efficient manner. In particular, it allows registers to be allocated to different uses, so as to complete multiple tasks efficiently, with limited resources.

Data processing devices suitable for use with and incorporating this invention are described in U.S. patent application Ser. No. 09/703,096 filed Feb. 18, 2000, entitled "Microprocessor with Improved Instruction Architecture, the disclosure of which is incorporated herein by reference. In an embodiment of the present invention, there are 64 general-purpose registers. General purpose registers A0, A1, A2, B0, B1 and B2 each may be used as a conditional register. Further, each .D unit may load and store double words (64 bits). The .D units may access words and double words on any byte boundary. The .D unit supports data as well as address cross paths. The same register may be used as a data path cross operand for more than one functional unit in an execute packet. A delay clock cycle is introduced when an instruction attempts to read a register via a cross path that was updated in the previous cycle. Up to two long sources and two long results may be accessed on each data path every cycle.

Each .M unit may perform two 16×16 bit multiplies and four 8×8 bit multiplies every clock cycle. Special communications-specific instructions, such as SHFL, DEAL, and GMPY4, are associated with the .M unit to address common operations in error-correcting codes. Bit-count, Bit-Reverse, and Rotate hardware on the .M unit extends support for bit-level algorithms, such as binary morphology, image metric calculations and encryption algorithms.

Increased orthogonality of the Instruction Set Architecture is provided, such that the .M unit may perform bi-directional variable shifts in addition to the .S unit's ability to do shifts. Such bi-directional shifts directly assist voice-compression codecs (vocoders).

Data flow enhancements include increased instruction set efficiency, including variable shift operations. A BNOP instruction helps reduce the number of instructions required to perform a branch when NOPs are needed to fill the delay slots of a branch. Pipeline discontinuities may arise from various causes, such as memory stalls, the STP instruction, and multi-cycle NOPs. The NOP count instruction provides count cycles for NOPs. If the count is greater than or equal to two (2), the NOP is a multi-cycle NOP. A NOP 2, for example, fills in extra delay slots for the instructors in the execute packet in which it is contained and for all previous execute packets. Thus if a NOP 2 is in parallel with an MPY instruction, the MPY's results are made available for use by instructions in the next execute packet. If the delay slots of a branch complete while a multi-cycle NOP is dispatching NOPs into the pipeline, the branch overrides the multi-cycle NOP, and the branch target begins execution after 5 delay slots. In still another embodiment of the present invention, there are no execute packet boundary restrictions, thereby eliminating a need to pad a fetch packet by adding unneeded NOP instructions.

In yet another embodiment of the invention, the move instruction is a variable delay move (MVD) instruction. In such an instruction, the operand is run down through a multiplier, such as that described below with respect to FIG. 7, and the source data or information is moved from register to register with a variable delay. An operation code, or Opcode, may be the first byte of the machine code that describes a particular type of operation and the combination of operands to the central processing unit (CPU). For example, the Opcode for the MVD instruction may be formed by the combination of a MVD (.unit) code coupled with the identification of a source (src2) and a destination (dst) code, e.g., .unit=.M1,.M2. In this format, the src2 opcode map field is used for the xint operand-type unit to describe a transmit interrupt for a serial port. A source file is a file that contains C code or some other assembly language code that is compiled or assembled to form an object file. Such a transmit interrupt is generated when the transmit register empties during transmission. Moreover, such a condition may indicate that the transmit register is ready to accept a new transmit character. The dst opcode map field is used for an int operand-type which identifies the destination port to which information is transferred.

Figure 6A:
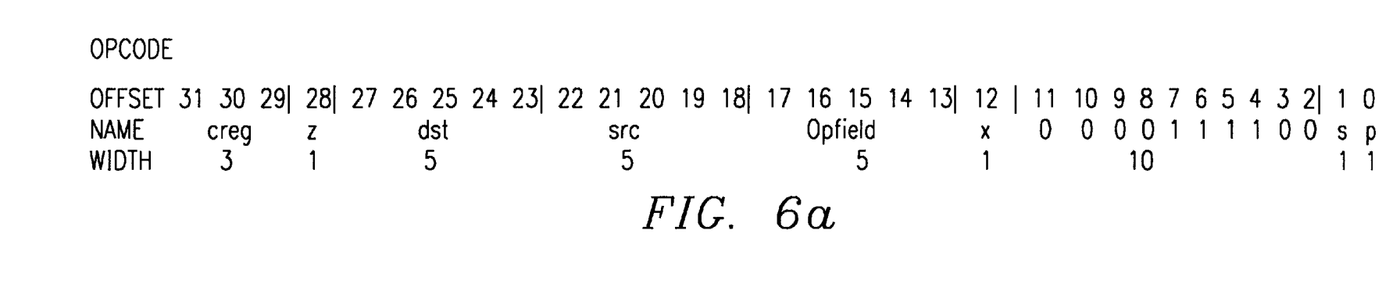
FIG. 6a depicts an example of a 32-bit Opcode showing the incorporation of instructions relating to .src and dst to perform a variable move delay operation.

Referring to FIG. 6a, an example of a 32-bit Opcode is depicted showing the incorporation of instructions relating to src and dst. In this example, a MVD instruction moves data from the src2 register to the dst register over 4 cycles. This is accomplished using the following multiplier path:

```
MVD        .M2X A0,B0  ;
NOP                    ;
NOP                    ;
NOP                    ; B0 = A0
```

Therefore, by this multiplier path, the value B0 is assigned to destination A0 after a delay of three slots or cycles. This is executed as follows:

```
if (cond)              src2 → dst
else nop
``` or if a specified condition is satisfied, src2 is transferred to dst, otherwise a NOP is performed until the specified condition occurs.

Figure 6B:
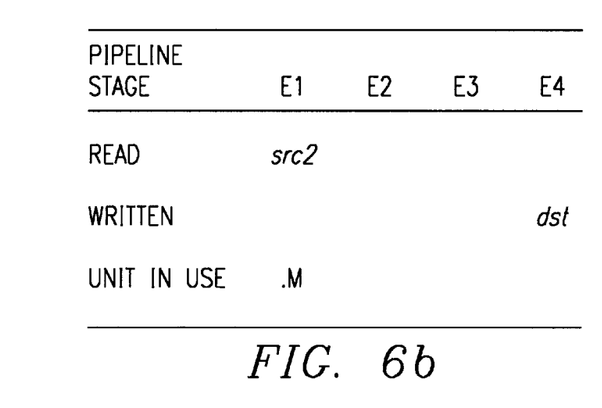
FIG. 6b depicts the pipeline format or performing a four cycle delayed move instruction having three delay slots.

Referring to FIG. 6b, the pipeline format for performing this delayed move instruction is depicted. In particular, this figure depics the relationship between the Read (src2) and Write (dst) steps and the Pipeline Stages (E1–E4).

As an example, the instruction: MVD .M2x A5,B8 calls for certain information in source register A to be moved to destination register B after four (4) cycles using a .M (multiplier) unit. Thus, the following shows the register state before and after the delayed move.

| Before Instruction | 4 Cycles After Instruction |
|---|---|
| A5 6A321193h | A5 6A321193h |
| B8 xxxx xxxxh | B8 6A321193h |

Figure 7:
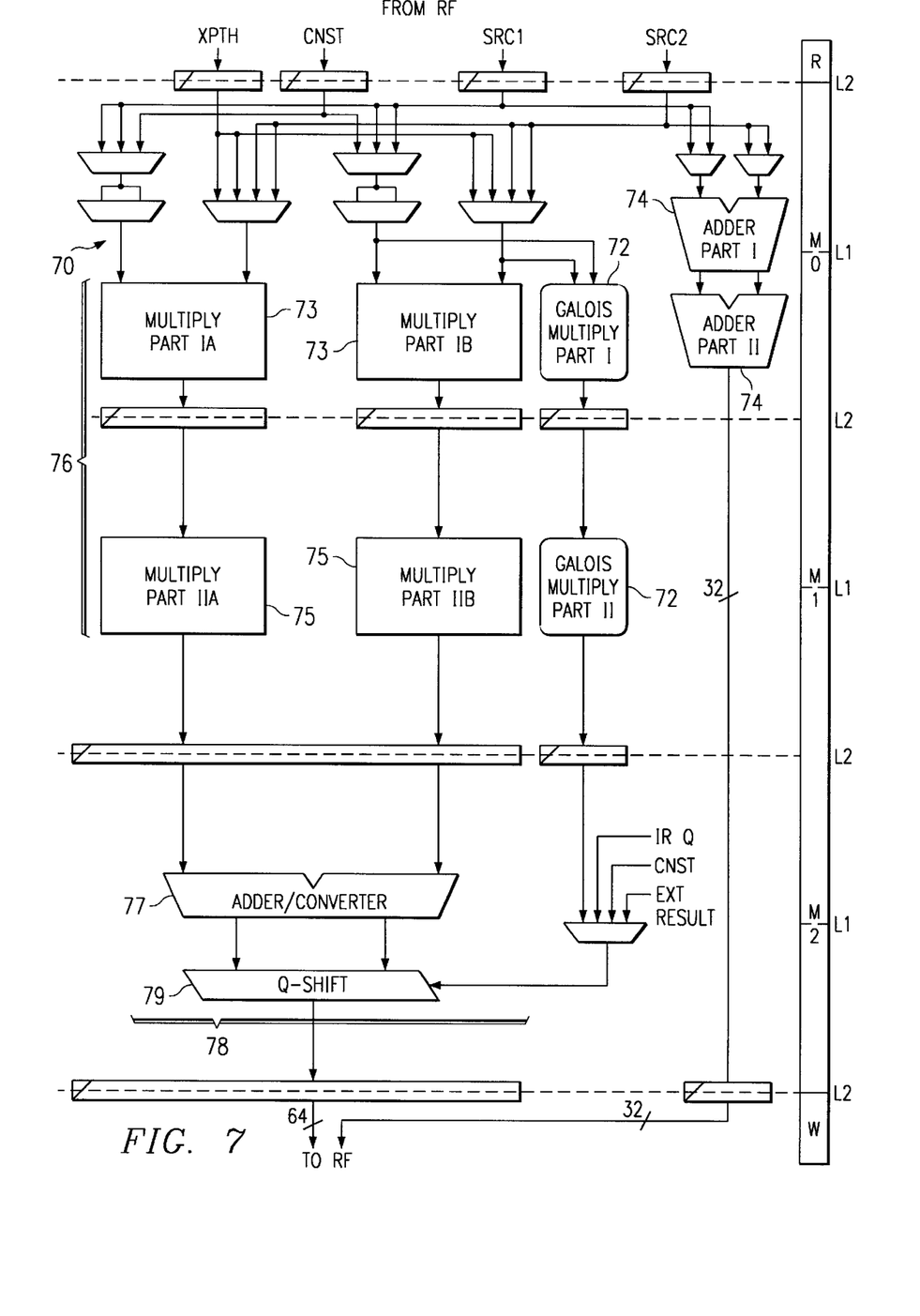
FIG. 7 is a top level block diagram of the .M unit group, which is optimized to handle multiplication, and depicts a multiplier path used by a variable move delay instruction.

FIG. 7 is a top level block diagram of the .M unit group 70, which is optimized to handle multiplication, although hardware is available for a limited set of add and subtract operations. Moreover, FIG. 7 depicts a multiplier path used by the MVD instruction. M unit group has three major functional units: M Galois multiply unit 72, M adder unit 74 and M multiply unit 76. While M adder unit 74 may complete its operations within the Execute cycle, the other two units require two additional cycles to complete the multiply operations. In general, M multiply unit 76 may perform the following operations: two 16×16 multiplies or four 8×8 multiplies with all combination of signed or unsigned numbers, Q-shifting and A-shifting of multiply results, rounding for extended multiply (EMPY) instructions, controlling the carry chain by breaking/joining the carry chain at 16-bit block boundaries, and saturation multiplication where the final result is shifted left by 1 or returns 0x7FFFFFFF if an overflow occurs. Multiplication is broken down into three stages, starting with Multiply Parts IA & IB 73, which provide the inputs for Multiply Parts IIA & B 75, followed by the final stage 78 which contains Adder/Converter 77 and Q-shift 79.

M Galois multiply unit 72 performs Galois multiply in parallel with M multiply unit 76. For output from M unit group, the Galois multiply results is muxed with the M multiply result. M adder unit 74 is only lightly coupled to the other units in M unit group: it shares a read port, but has a dedicated write port, making it possible for both a multiply and an add instruction to write results in the same cycle from M unit group.

Although the invention has been described with respect to preferred embodiments, foregoing description and example are intended to be merely exemplary of the invention. The true scope and spirit of the invention is not intended to be limited by the foregoing description and example, but instead is intended to be commensurate with the scope of the following claims. Variations and modifications on the elements of the claimed invention will be apparent to persons skilled in the art from a consideration of this specification or practice of the invention disclosed herein.

We claim:

1. A method for implementing a variable length delay instruction, comprising the steps of:

designating a source register for holding information;

designating a destination register for retrieving said information;

determining a first number of cycles before retrieval of said information to said destination register;

transferring said information from said source register to delaying means for said first number of cycles; and writing said information from said delaying means to said destination register.

2. The method of claim 1, further comprising the step of retaining said information in said source register for a second number of cycles, wherein said second number of cycles is less than said first number of cycles.

3. The method of claim 2, wherein said second number of cycles equals said first number of cycles plus one.

4. The method of claim 1, wherein said delaying means is a queue comprising a plurality of serially connected, holding devices and a multiplexer connected in parallel to said plurality of holding devices.

5. The method of claim 4, wherein said holding devices are latches.

6. The method of claim 4, further comprises a counter to transmit a triggering signal to a select line in said multiplexer.

7. The method of claim 1, wherein said delaying means comprises a plurality of two-way multiplexers, each of said multiplexers placed between a pair of holding devices.

8. An apparatus for implementing variable length delay instructions, comprising:

an input line for reading information from a source register;

a queue of serially-connected, holding devices for receiving said information read from said source register;

a multiplexer aligned in parallel with said serially-connected, holding devices; and a select line, whereby a trigger signal is transmitted to said multiplexer, thereby instructing said multiplexer to write said information to a destination register.

9. The apparatus of claim 8, wherein said holding devices are latches.

10. An apparatus for implementing variable length delay instructions, comprising:

an input line for reading information from a source register;

a plurality of two-way multiplexers, each of said multiplexers placed between a pair of holding devices;

and a select line, whereby a trigger signal is transmitted to by each of said plurality of multiplexers, thereby instructing at least one of said multiplexers to write said information to a destination register.

11. The apparatus of claim 10, wherein said holding devices are latches.

12. An apparatus for implementing variable length delay instructions, comprising:

an input line for reading information from a source register;

delaying means for receiving said information read from said source register;

at least one multiplexer; and a select line, whereby a trigger signal is transmitted to said at least one multiplexer, thereby instructing said at least one multiplexer to write said information to a destination register.

13. A method for implementing a variable length delay instruction, comprising the steps of defining a first operation, which generates a value;

determining a delay between generation of said value by said first operation and arrival of said value at a second operation; and implementing a delaying means for delaying arrival of said value at said second operation.

14. The method of claim 13, further comprising the steps of:

defining a source operand for retrieving values operated on by said first operation; and defining a destination operand for receiving values generated by said second operation.

15. The method of claim 13, wherein said first operation is a defining operation and said second operation is a using operation.

* * * * *